United States Patent
Ueda

(10) Patent No.: US 10,496,430 B2
(45) Date of Patent: Dec. 3, 2019

(54) INFORMATION PROCESSING SYSTEM, AUTOSCALING ASSOCIATION APPARATUS, AND NON-TRANSITORY COMPUTER READABLE MEDIUM FOR DETERMINING A NECESSARY NUMBER OF VIRTUAL MACHINES

(71) Applicant: FUJI XEROX CO., LTD., Tokyo (JP)

(72) Inventor: Hiroyuki Ueda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 31 days.

(21) Appl. No.: 15/688,083

(22) Filed: Aug. 28, 2017

(65) Prior Publication Data

US 2018/0276021 A1  Sep. 27, 2018

(51) Int. Cl.
*G06F 9/455* (2018.01)
*G06F 9/50* (2006.01)

(52) U.S. Cl.
CPC ........ *G06F 9/45558* (2013.01); *G06F 9/5027* (2013.01); *G06F 2009/4557* (2013.01); *G06F 2009/45562* (2013.01); *G06F 2009/45579* (2013.01)

(58) Field of Classification Search
None
See application file for complete search history.

(56) References Cited

U.S. PATENT DOCUMENTS

| 2015/0277956 A1 | 10/2015 | Uchikawa et al. |
| 2016/0283261 A1 | 9/2016 | Nakatsu |
| 2016/0378564 A1* | 12/2016 | Gaurav ................. G06F 9/5077 718/1 |

FOREIGN PATENT DOCUMENTS

| JP | 2015-194958 A | 11/2015 |
| JP | 2016-181185 A | 10/2016 |
| JP | 2017-041185 A | 2/2017 |

\* cited by examiner

*Primary Examiner* — Eric C Wai
(74) *Attorney, Agent, or Firm* — Oliff PLC

(57) ABSTRACT

An information processing system includes one or more virtual machines, a container scaling apparatus, a virtual-machine scaling apparatus, a calculating unit, and a reflecting unit. The container scaling apparatus performs autoscaling of a container that runs on the one or more virtual machines. The virtual-machine scaling apparatus performs autoscaling of the virtual machines in accordance with a difference in a necessary number of virtual machines and a number of virtual machines that are currently running. The calculating unit calculates, from a necessary number of containers calculated by the container scaling apparatus, a number of virtual machines that is necessary to cause the necessary number of containers to run thereon. The reflecting unit reflects the number calculated by the calculating unit to the necessary number of virtual machines to be used by the virtual-machine scaling apparatus.

4 Claims, 4 Drawing Sheets

FIG. 2

| VIRTUAL MACHINE ID | RUNNING CONTAINER |
|---|---|
| 1 | CONTAINER A, CONTAINER B, CONTAINER C |
| 2 | CONTAINER A |
| ... | ... |

FIG. 3

| KIND OF CONTAINER | RESOURCE USE RATIO TO RESOURCE OF VIRTUAL MACHINE |
|---|---|
| CONTAINER A | 0.5 |
| CONTAINER B | 0.2 |
| ... | ... |

US 10,496,430 B2

INFORMATION PROCESSING SYSTEM, AUTOSCALING ASSOCIATION APPARATUS, AND NON-TRANSITORY COMPUTER READABLE MEDIUM FOR DETERMINING A NECESSARY NUMBER OF VIRTUAL MACHINES

CROSS-REFERENCE TO RELATED APPLICATIONS

This application is based on and claims priority under 35 USC 119 from Japanese Patent Application No. 2017-057642 filed Mar. 23, 2017.

BACKGROUND

(i) Technical Field

The present invention relates to an information processing system, an autoscaling association apparatus, and a non-transitory computer readable medium.

(ii) Related Art

In hypervisor-based virtualization, which is widely used as a computer virtualization method, each virtual machine is created on an operating system (OS, host OS) of a physical machine, and an independent guest OS environment is run on the individual virtual machine.

On the other hand, in container-based virtualization, which has been widely used in recent years, resources are made to be separate for each user by individually creating an application execution environment for each user on the host OS. Container-based virtualization is more efficient than hypervisor-based virtualization because each user does not have to individually run the guest OS.

In recent years, a hybrid system obtained by combining a hypervisor-based system with a container-based system has also been proposed. In hybrid systems, containers are created on virtual machines.

In a hybrid system of the related art, autoscaling at a virtual-machine level and autoscaling at a container level are performed independently of each other. That is, in the related art, autoscaling of a group of virtual machines is performed in accordance with conditions such as load conditions of the group of virtual machines, and autoscaling of a group of containers is performed in accordance with conditions such as load conditions of the group of containers.

SUMMARY

According to an aspect of the invention, there is provided an information processing system including one or more virtual machines, a container scaling apparatus, a virtual-machine scaling apparatus, a calculating unit, and a reflecting unit. The container scaling apparatus performs autoscaling of a container that runs on the one or more virtual machines. The virtual-machine scaling apparatus performs autoscaling of the virtual machines in accordance with a difference in a necessary number of virtual machines and a number of virtual machines that are currently running. The calculating unit calculates, from a necessary number of containers calculated by the container scaling apparatus, a number of virtual machines that is necessary to cause the necessary number of containers to run thereon. The reflecting unit reflects the number calculated by the calculating unit to the necessary number of virtual machines to be used by the virtual-machine scaling apparatus.

BRIEF DESCRIPTION OF THE DRAWINGS

An exemplary embodiment of the present invention will be described in detail based on the following figures, wherein:

FIG. 2 illustrates an example of contents of data stored in a container-machine information managing unit;

FIG. 3 illustrates an example of contents of data stored in a resource-use-ratio managing unit;

DETAILED DESCRIPTION

An example of a cloud service system according to an exemplary embodiment will be described with reference to FIG. 1.

Figure 1:
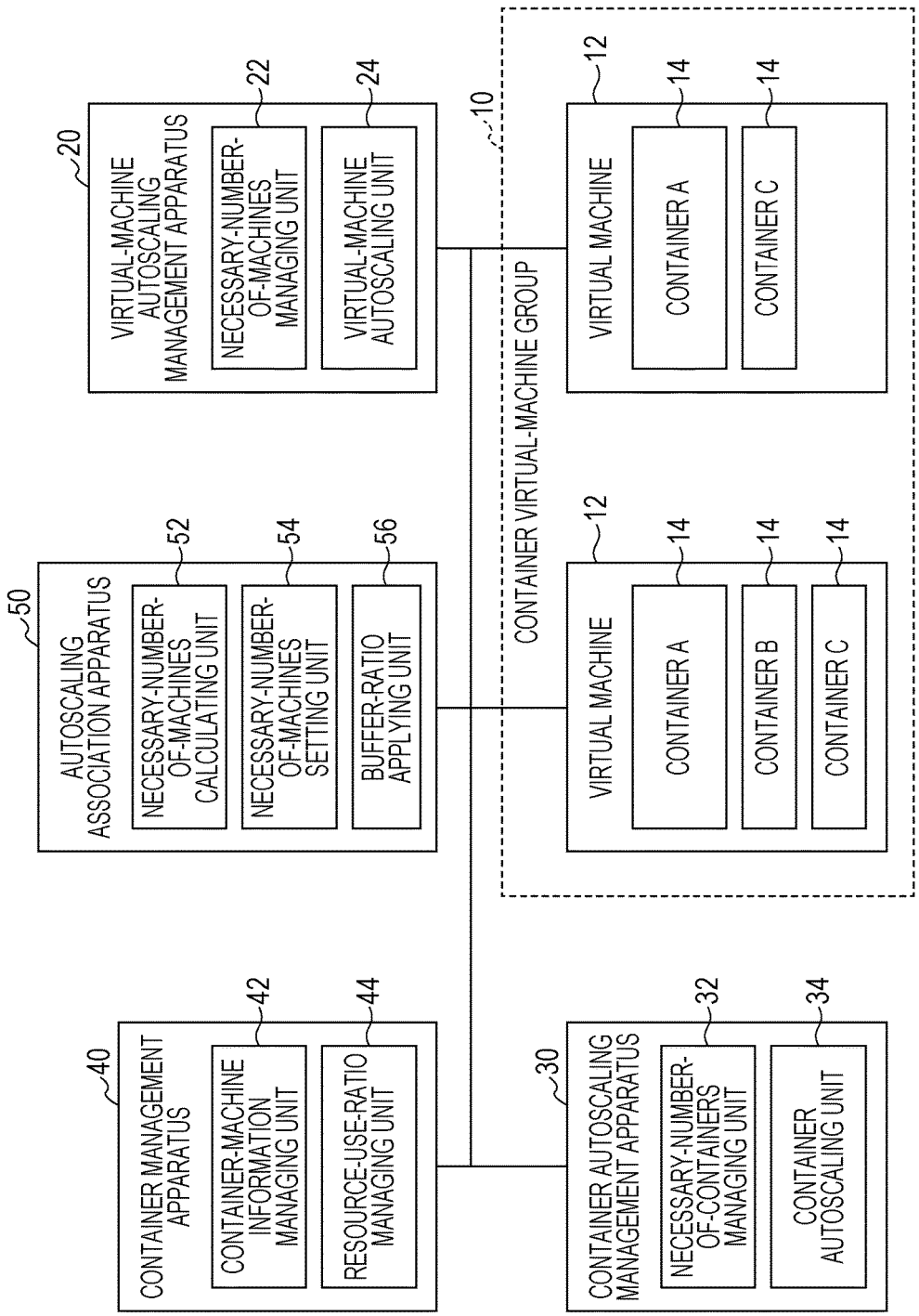
FIG. 1 illustrates an example of a system configuration according to the exemplary embodiment.

The cloud service system in FIG. 1 includes a container virtual-machine group 10, a virtual-machine autoscaling management apparatus 20, a container autoscaling management apparatus 30, a container management apparatus 40, and an autoscaling association apparatus 50.

The container virtual-machine group 10 is a group of virtual machines run in a system including one or more physical computers. Each physical computer includes hardware resources such as one or more central processing units (CPUs), memory devices (primary storage devices), and secondary storage devices. Hypervisor-based virtualization virtual machines run on operating systems of the physical computers. Among the virtual machines, the container virtual-machine group 10 is a group of virtual machines 12 that are used for causing containers to run thereon.

Container-based virtualization containers 14 run on each of the virtual machines 12, and applications are run in the containers 14. In the example of FIG. 1, a state is illustrated in which three containers 14 of three kinds, which are containers A, B, and C, are running on either of two virtual machines 12 and in which two containers 14 of two kinds, which are containers A and C, are running on the other of the virtual machines 12.

The virtual-machine autoscaling management apparatus 20 performs autoscaling at the virtual-machine level. In the autoscaling at the virtual-machine level, scale-out of the group of virtual machines (increasing the number of virtual machines) and scale-in of the group of virtual machines (decreasing the number of virtual machines) are performed. The virtual-machine autoscaling management apparatus 20 performs autoscaling of the virtual machines in association with a necessary number of containers 14, which is obtained through autoscaling of the containers 14 performed by the container autoscaling management apparatus 30, which will be described next.

The virtual-machine autoscaling management apparatus 20 includes a necessary-number-of-machines managing unit 22 and a virtual-machine autoscaling unit 24. The necessary-number-of-machines managing unit 22 manages the number of virtual machines that is determined to be necessary under the current conditions (this number is referred to as a necessary number of machines). In the exemplary embodiment, the autoscaling association apparatus 50, which will be described later, sets the necessary number of machines in the necessary-number-of-machines managing unit 22. The virtual-machine autoscaling unit 24 performs autoscaling of the group of virtual machines 12 in accordance with the difference between the necessary number of machines managed by the necessary-number-of-machines managing unit 22 and the number of virtual machines 12 that are currently running (number of current machines).

The container autoscaling management apparatus 30 performs autoscaling at the container level. That is, if the load of a certain kind of containers increases, the containers are subjected to scale-out (i.e., the number of containers is increased), and if the load decreases, the containers are subjected to scale-in (i.e., the number of containers is decreased). For example, if the load of applications of the containers A increases, the containers A are subjected to scale-out (i.e., a new container A is started), and if the load thereof decreases, the number of containers A is decreased (i.e., a container or containers selected on the basis of a predetermined criterion from among the existing containers A are stopped and removed).

The container autoscaling management apparatus 30 includes a necessary-number-of-containers managing unit 32 and a container autoscaling unit 34. The necessary-number-of-containers managing unit 32 manages the number of containers 14 of each kind that is determined to be necessary under the current conditions of the containers 14 of the kind (this number is referred to as a necessary number of containers). For example, from the total load amounts of one or more containers 14 of a certain kind, the necessary-number-of-containers managing unit 32 calculates the number of containers that is necessary to process the load amounts by a known method (i.e., the number of containers corresponding to the load amount) as the necessary number of containers. The load amount of each container 14 may be, for example, the number of requests that have been processed by the container 14 in a unit time, the number of requests accumulated in a queue of requests for the container 14, or the like. In accordance with the difference between the necessary number of containers calculated by the necessary-number-of-containers managing unit 32 and the number of containers 14 that are currently running (number of current containers), the container autoscaling unit 34 performs autoscaling of the group of containers 14.

The container management apparatus 40 manages various kinds of information about the containers and includes a container-machine information managing unit 42 and a resource-use-ratio managing unit 44. The container-machine information managing unit 42 manages information about the containers 14 that are running on each virtual machine 12. The information managed by the container-machine information managing unit 42 is, for example, as illustrated in FIG. 2, information in which the identifier (ID) of each virtual machine 12 is associated with a list of IDs of the containers 14 that are running on the virtual machine 12. From the ID of each container 14, the kind of the container 14 may be determined.

As illustrated in FIG. 3, the resource-use-ratio managing unit 44 manages a resource use ratio of the containers 14 of each kind. The resource use ratio of the containers 14 of a certain kind is a ratio of a resource amount to be used by one of the container 14 of this kind to the resource amount that may be allocated by a virtual machine 12 to the group of containers 14. The resource amount to be used by the container 14 here is not a resource use amount that continuously changes while the container 14 is actually running, but is a resource amount that is necessary (or recommended) to appropriately cause the container 14 to run. A higher-level system that manages the virtual machine 12 allocates resources to the virtual machine 12, and a part of the allocated resources is used for processing of the virtual machine 12 (e.g., operation management of the virtual machine 12), and the rest of the allocated resources, which is the larger part, is allocated to the group of containers 14 to run on the virtual machine (subject machine).

For example, focusing on a memory amount as a resource, if, for example, the memory amount that the virtual machine 12 may allocate to the group of containers on the subject machine is 4 GB and the memory amount that is necessary for a kind of container, such as a container A, to perform a process is 2 GB, the resource use ratio of the container A is 0.5 (i.e., 50%). For example, focusing on the number of CPU cores as a resource, if, for example, the number of CPU cores that the virtual machine 12 may allocate to the group of containers on the subject machine is 8 and the number of CPU cores that is necessary for the container A to perform a process is 2, the resource use ratio of the container A is 0.25 (i.e., 25%). In addition, focusing on multiple resources such as the memory amount and the CPU cores, the resource use ratio is a final value obtained by calculating the resource use ratios of the individual resources of the container (e.g., by selecting the maximum resource use ratio).

The autoscaling association apparatus 50 performs a process for associating autoscaling at the virtual-machine level with autoscaling at the container level. The autoscaling association apparatus 50 includes a necessary-number-of-machines calculating unit 52 and a necessary-number-of-machines setting unit 54. The autoscaling association apparatus 50 may further include a buffer-ratio applying unit 56.

The necessary-number-of-machines calculating unit 52 calculates the necessary number of machines by using the necessary number of containers calculated by the container autoscaling management apparatus 30. Since the container autoscaling management apparatus 30 calculates the necessary number of containers of the containers 14 of each kind, the necessary-number-of-machines calculating unit 52 also calculates the necessary number of machines for the containers 14 of the kind. Then, the necessary-number-of-machines calculating unit 52 adds the numbers of necessary machines for the containers 14 of all kinds, thereby calculating the number of virtual machines 12 that is necessary in a whole system (total necessary number of machines).

The necessary number of machines for the containers 14 of a certain kind is, for example, calculated by multiplying the resource use ratio of the containers 14 of this kind by the necessary number of containers of the containers 14 of this kind. Since the resource use ratio indicates the ratio of a resource to be used by a container 14 of this kind to a resource of a virtual machine 12, by multiplying this ratio by the necessary number of containers, the number of virtual machines 12 that is necessary to correspond to the necessary number of containers of the containers 14 of this kind may be estimated.

The necessary-number-of-machines setting unit 54 sets the necessary number of machines calculated by the necessary-number-of-machines calculating unit 52 in the necessary-number-of-machines managing unit 22 of the virtual-machine autoscaling management apparatus 20.

The buffer-ratio applying unit 56 applies a buffer ratio to the necessary number of machines calculated by the necessary-number-of-machines calculating unit 52. The buffer ratio is a coefficient of greater than or equal to 1 for overestimating the necessary number of machines. For example, if the necessary number of machines calculated by the necessary-number-of-machines calculating unit 52 is multiplied by a buffer ratio of greater than 1, a value larger than the necessary number of machines calculated directly from the necessary number of containers (i.e., necessary number of containers×resource use ratio) may be obtained. If this value is set in the virtual-machine autoscaling management apparatus 20, autoscaling of the group of virtual machines 12 is performed by using, as a target value, a value larger than the necessary number of machines calculated directly from the necessary number of containers. In this manner, if a buffer ratio of greater than 1 is used, the number of virtual machines 12 in the whole system becomes a value including a small margin in accordance with the necessary number of containers. If the number of virtual machines 12 is insufficient when starting a new container 14, it takes a certain amount of time to prepare a new virtual machine 12 from this time point because an OS or the like of the virtual machine 12 has to be started. If an overestimated number of virtual machines 12 are prepared in advance by using a buffer ratio of greater than 1, although cost is increased for the increased number of virtual machines 12, calculation may be performed immediately even if the number of containers increases. Note that, if the buffer ratio is set to 1, the exact necessary number of machines obtained by (necessary number of containers)×(resource use ratio) is set in the virtual-machine autoscaling management apparatus 20.

The autoscaling association apparatus 50 includes a setting item as to whether or not the buffer ratio is applied by using the buffer-ratio applying unit 56, a setting item as to the value of the buffer ratio to be used when the buffer ratio is applied, and the like, and a manager of the system sets these items.

Next, an example of a process procedure of autoscaling at the virtual-machine level performed by the virtual-machine autoscaling management apparatus 20 (particularly the virtual-machine autoscaling unit 24) will be described with reference to FIG. 4. In this example, the virtual-machine autoscaling management apparatus 20 determines whether the resultant value of subtracting the number of current machines (number of virtual machines 12 that are currently running) from the necessary number of machines stored in the necessary-number-of-machines managing unit 22 is a positive value, a negative value, or zero (S10). The necessary number of machines used here is set by the autoscaling association apparatus 50.

If "(the necessary number of machines)−(the number of current machines)" is a positive value, the number of current virtual machines 12 is smaller than the necessary number of machines, and accordingly, the virtual-machine autoscaling management apparatus 20 performs scale-out of the group of virtual machines 12 (S12). That is, a new virtual machine 12 is started.

If "(the necessary number of machines)−(the number of current machines)" is zero, the number of current machines is equal to the necessary number of machines, and thus, the number of virtual machines 12 does not have to be increased or decreased. In this case, the virtual-machine autoscaling management apparatus 20 ends the process.

If "(the necessary number of machines)−(the number of current machines)" is a negative value, the number of current virtual machines 12 is greater than the necessary number of machines. In this case, the virtual-machine autoscaling management apparatus 20 performs scale-in (S14). That is, the virtual-machine autoscaling management apparatus 20 searches for a virtual machine 12 that does not cause any problem if stopped. If such a virtual machine 12 is found, the virtual-machine autoscaling management apparatus 20 stops the virtual machine 12.

Figure 4:
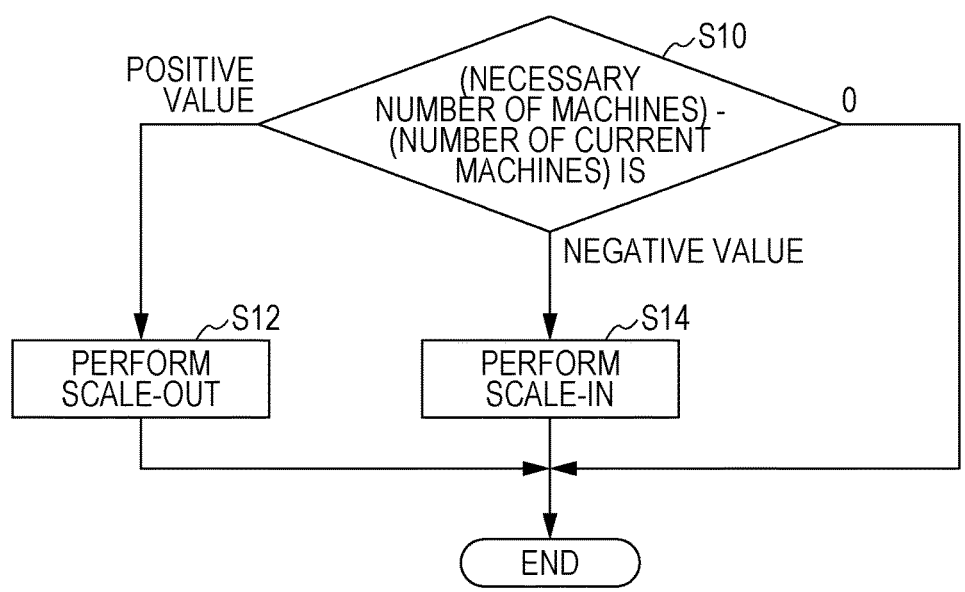
FIG. 4 illustrates an example of a process procedure of a virtual-machine autoscaling management apparatus.

The process procedure of autoscaling at the container level performed by the container autoscaling management apparatus 30 may be substantially the same as the procedure of the virtual-machine autoscaling management apparatus 20 illustrated in FIG. 4. That is, the container autoscaling management apparatus 30 calculates the difference between the necessary number of containers and the number of current containers of the containers 14 of each kind. If the difference is a positive value, the container autoscaling management apparatus 30 performs scale-out (starts an additional container 14 of the kind); if the difference is a negative value, the container autoscaling management apparatus 30 performs scale-in (some of the containers 14 of the kind are stopped); and if the difference is zero, the container autoscaling management apparatus 30 keeps the current state.

Figure 5:
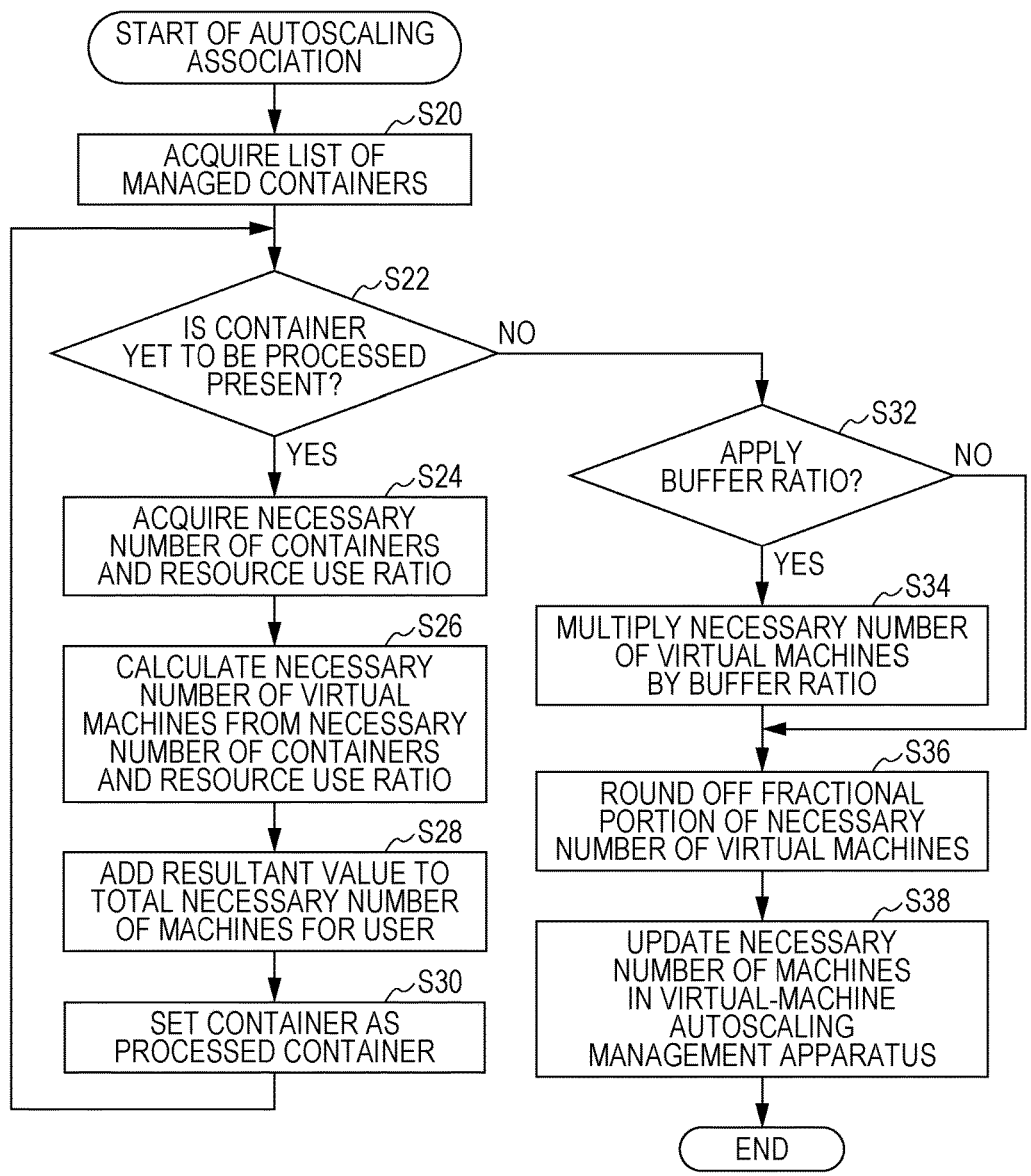
FIG. 5 illustrates an example of a process procedure of an autoscaling association apparatus.

Next, an example of a process procedure of the autoscaling association apparatus 50 will be described with reference to FIG. 5.

In this procedure, first, the necessary-number-of-machines calculating unit 52 acquires, from the container-machine information managing unit 42, a list of kinds of the containers 14 (e.g., containers A, B, and C in FIG. 1) that are currently running in a system (S20). Then, the necessary-number-of-machines calculating unit 52 repeats the process in S22 through S30 for each kind of containers included in the acquired list. That is, first, the necessary-number-of-machines calculating unit 52 determines whether or not the acquired list of kinds of the containers includes a kind of container for which the process in S22 through S30 has yet to be performed (kind of container yet to be processed) (S22), and if there is a kind of container yet to be processed, the kind of container is extracted. Then, information about the resource use ratio of the extracted kind of container is acquired from the container management apparatus 40, and the necessary number of containers of this kind of container is acquired from the container autoscaling management apparatus 30 (S24). Then, the necessary-number-of-machines calculating unit 52 multiplies the acquired resource use ratio by the necessary number of containers, thereby calculating the necessary number of machines for this kind of container (S26). Then, the resultant value of the calculation is added to the "necessary number of machines in the whole system" (initialized to zero at the time of starting the procedure in FIG. 5) (S28). Note that, for example, if the cloud service system performs autoscaling of the number of containers to run and the number of virtual machines for each user, the procedures in FIGS. 4 and 5 are performed for each user. In this case, the "necessary number of machines in the whole system" in S28 is the number of virtual machines that are necessary for the user.

Following S28, the necessary-number-of-machines calculating unit 52 determines that the kind of container that was processed in S24, S26, and S28 is a processed kind of container (S30) and returns to S22.

If the above-described process in S22 through S30 has been performed for all of the kinds of containers included in the list acquired in S20, the result of determination in S22 is NO. In this case, the necessary-number-of-machines calculating unit 52 determines whether a setting for applying a buffer ratio by using the buffer-ratio applying unit 56 has been set (S32), and if the setting for applying the buffer ratio has been set, the necessary-number-of-machines calculating unit 52 multiplies the necessary number of machines in the whole system obtained through repetition of the process in S22 through S30 by the buffer ratio (S34). Then, the fractional portion of the resultant value of the multiplication is rounded off, and thereby a final necessary number of machines is obtained (S36). If the setting for applying the buffer ratio has not been set, skipping S34, the fractional portion of the necessary number of machines in the whole system is rounded off, and thereby the final necessary number of machines is obtained (S36).

Following S36, the necessary-number-of-machines setting unit 54 sets the necessary number of machines obtained in S36 in the necessary-number-of-machines managing unit 22 of the virtual-machine autoscaling management apparatus 20 (i.e., the necessary number of machines stored in the necessary-number-of-machines managing unit 22 is updated to the value obtained in S36) (S38).

The process of the autoscaling association apparatus 50 (FIG. 5) is performed in response to, for example, updating of the necessary number of containers by the container autoscaling management apparatus 30. For example, the autoscaling association apparatus 50 performs the process when the container autoscaling management apparatus 30 notifies the autoscaling association apparatus 50 by push notification or by making a call to an application programming interface (API) upon updating the necessary number of containers. As another example, the autoscaling association apparatus 50 may perform the process illustrated in FIG. 5 on a regular basis, in which case, the container autoscaling management apparatus 30 does not have to have the above-described mechanism for notification or the like in order to cause the autoscaling association apparatus 50 to operate.

In the above-described examples, the virtual-machine autoscaling management apparatus 20 uses the necessary number of machines calculated by the autoscaling association apparatus 50 from the necessary number of containers directly as the target value of autoscaling. However, this is merely an example. The virtual-machine autoscaling management apparatus 20 may perform autoscaling by using, as the target value, a necessary number of machines obtained by correcting the necessary number of machines calculated by the autoscaling association apparatus 50 from the necessary number of containers in accordance with, for example, the load of the group of virtual machines 12 (or by calculating the necessary number of machines calculated by using the load of the group of virtual machines 12). In the above manner, in the exemplary embodiment, the necessary number of machines to be used by the virtual-machine autoscaling management apparatus 20 as the target value of autoscaling reflects the necessary number of machines calculated by the autoscaling association apparatus 50 from the necessary number of containers.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   one or more virtual machines; and
   a hardware processor and a memory, the hardware processor configured to operate as:
   a container scaling apparatus that performs autoscaling of a container that runs on the one or more virtual machines;
   a virtual-machine scaling apparatus that performs autoscaling of the virtual machines in accordance with a difference in a necessary number of virtual machines and a number of virtual machines that are currently running;
   a calculating unit that calculates, from a necessary number of containers calculated by the container scaling apparatus, a number of virtual machines that is necessary to cause the necessary number of containers to run thereon; and
   a reflecting unit that communicates the number calculated by the calculating unit as the necessary number of virtual machines to be used by the virtual-machine scaling apparatus,
   wherein the calculating unit calculates the necessary number of virtual machines by multiplying, by a buffer ratio of greater than 1, a number obtained by multiplying, by the necessary number of containers, a resource use ratio indicating a ratio of resources to be used by one of the containers to resources of one of the virtual machines.

2. An autoscaling association apparatus comprising:
   a hardware processor and a memory, the hardware processor configured to operate as:
   a calculating unit that calculates, from a necessary number of containers calculated by a container scaling apparatus, a number of virtual machines that is necessary to cause the necessary number of containers to run thereon; and
   a reflecting unit that communicates the number calculated by the calculating unit as a necessary number of virtual machines to be used by a virtual-machine scaling apparatus that performs autoscaling of the virtual machines in accordance with a difference between the necessary number of virtual machines and a number of virtual machines that are currently running,
   wherein the calculating unit calculates the necessary number of virtual machines by multiplying, by a buffer ratio of greater than 1, a number obtained by multiplying, by the necessary number of containers, a resource use ratio indicating a ratio of resources to be used by one of the containers to resources of one of the virtual machines.

3. The autoscaling association apparatus according to claim 2, wherein the calculating unit calculates the necessary number of virtual machines by using a resource use ratio and the necessary number of containers, the resource use ratio indicating a ratio of resources to be used by one of the containers to resources of one of the virtual machines.

4. A non-transitory computer readable medium storing a program causing a computer to execute a process for autoscaling association, the process comprising:
   calculating, from a necessary number of containers calculated by a container scaling apparatus, a number of virtual machines that is necessary to cause the necessary number of containers to run thereon; and
   reflecting the number obtained through the calculating to a necessary number of virtual machines to be used by a virtual-machine scaling apparatus that performs autoscaling of the virtual machines in accordance with a difference between the necessary number of virtual machines and a number of virtual machines that are currently running, wherein the calculating of the necessary number of virtual machines occurs by multiplying, by a buffer ratio of greater than 1, a number obtained by multiplying, by the necessary number of containers, a resource use ratio indicating a ratio of resources to be used by one of the containers to resources of one of the virtual machines.

* * * * *